(No Model.) 4 Sheets—Sheet 1.

H. L. DAY.
SEPARATOR.

No. 567,021. Patented Sept. 1, 1896.

Witnesses.
Chas. E. Van Dorn
H. B. Avery.

Inventor.
Henry L. Day,
By
Paul & Hawley
his Attorneys.

(No Model.)

4 Sheets—Sheet 2.

H. L. DAY.
SEPARATOR.

No. 567,021.

Patented Sept. 1, 1896.

Witnesses,
Chas. E. VanDor
H. B. Avry

Inventor,
Henry L. Day.
By
Paul & Hawley
his Attorneys.

(No Model.) 4 Sheets—Sheet 3.

H. L. DAY.
SEPARATOR.

No. 567,021. Patented Sept. 1, 1896.

Witnesses
G. E. Purple
H. B. Ansey

Inventor
Henry L. Day.
By Paul & Hawley
Atty's

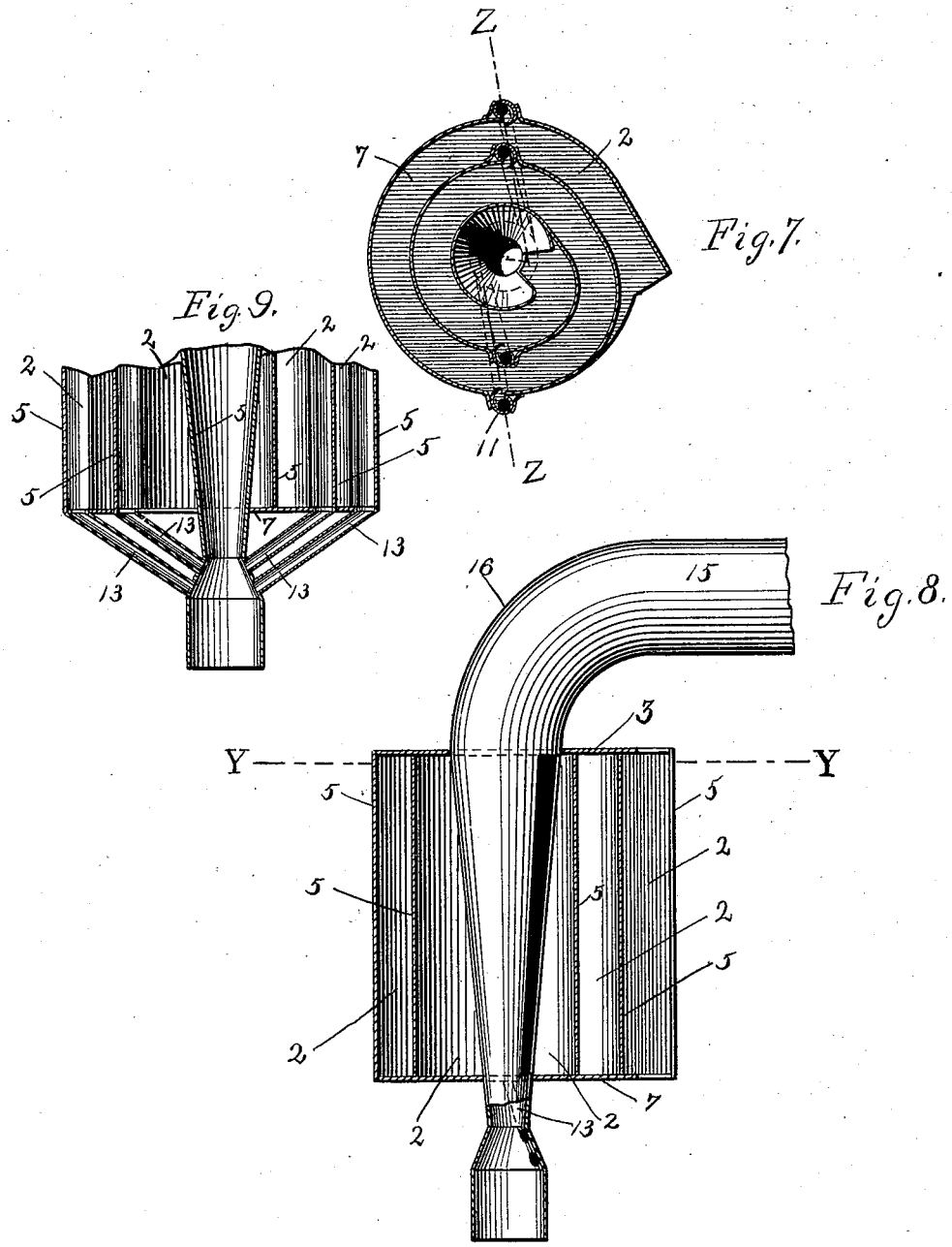

UNITED STATES PATENT OFFICE.

HENRY L. DAY, OF MINNEAPOLIS, MINNESOTA.

SEPARATOR.

SPECIFICATION forming part of Letters Patent No. 567,021, dated September 1, 1896.

Application filed January 12, 1894. Serial No. 496,621. (No model.)

*To all whom it may concern:*

Be it known that I, HENRY L. DAY, of Minneapolis, Hennepin county, State of Minnesota, have invented certain new and useful Improvements in Separators, of which the following is a specification.

This invention relates to improvements in devices designed for use in woodworking establishments, in connection with suction-fans and suitable piping, by means of which the shavings and sawdust are drawn away from the woodworking machines by an air-current, and are separated from the air-current and discharged into a suitable shavings-room, or into a fuel-feeder that conducts them directly to a furnace, while the air-current, freed from the dust and shavings, is permitted to escape. The device may also be used in connection with flour-mill or grain-cleaning machinery, or in any place where it is desirable to separate dust from currents of air, or water from steam, or any solid particles from gaseous currents in which they are held in suspension. This device consists generally in a convolute or flat spiral chamber or passage having a closed top, and provided with an inlet pipe or conductor at its inner or central portion, and having an opening at or near its outer portion for the purified air, steam, or other gaseous current, and an opening in its lower or bottom wall for the escape of the dust, water, or solid particles that have been separated from the gaseous current, said chamber or passage being also preferably provided with skimmers or deflectors upon the inner surface of its spiral wall to direct the dust or solid particles to the discharge-opening. The device is also preferably provided with suitable hoppers or receivers arranged to receive the dust or solid particles from the discharge-opening and to conduct such dust or solid particles to a suitable discharge pipe or pipes.

The invention consists, further, in the constructions and combinations hereinafter described, and particularly pointed out in the claims.

Figure 1:
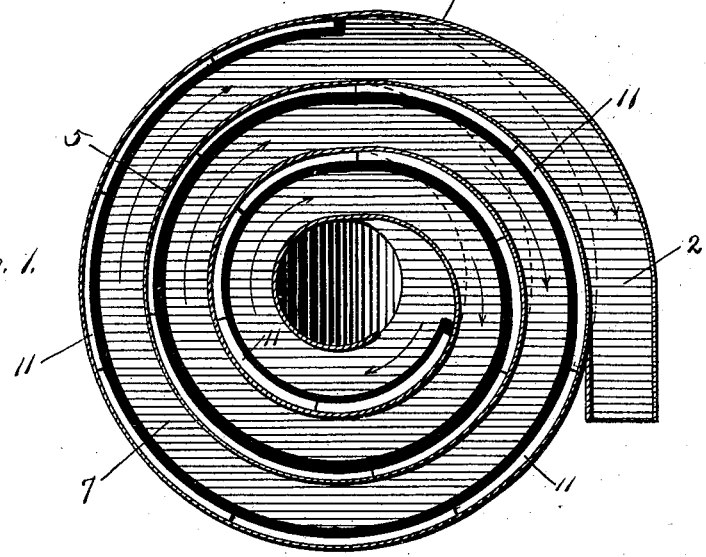
Figure 2:
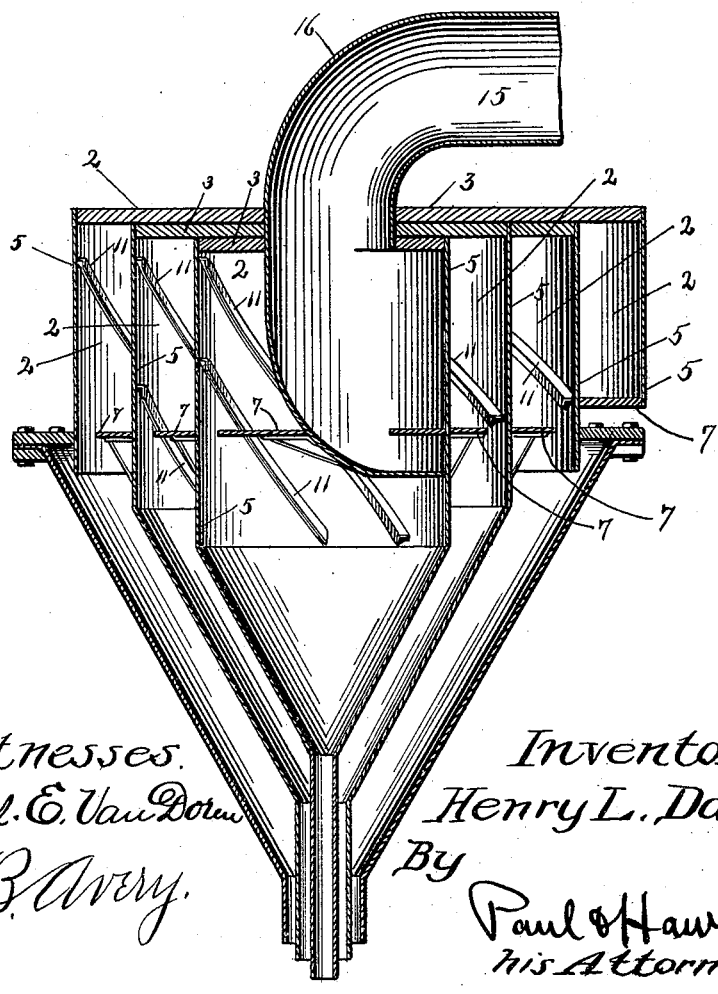
Figure 3:
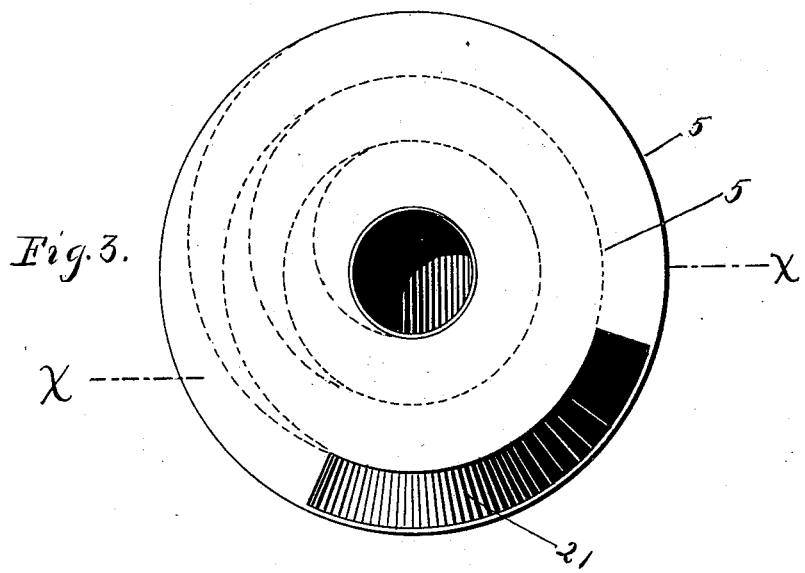
Figure 4:
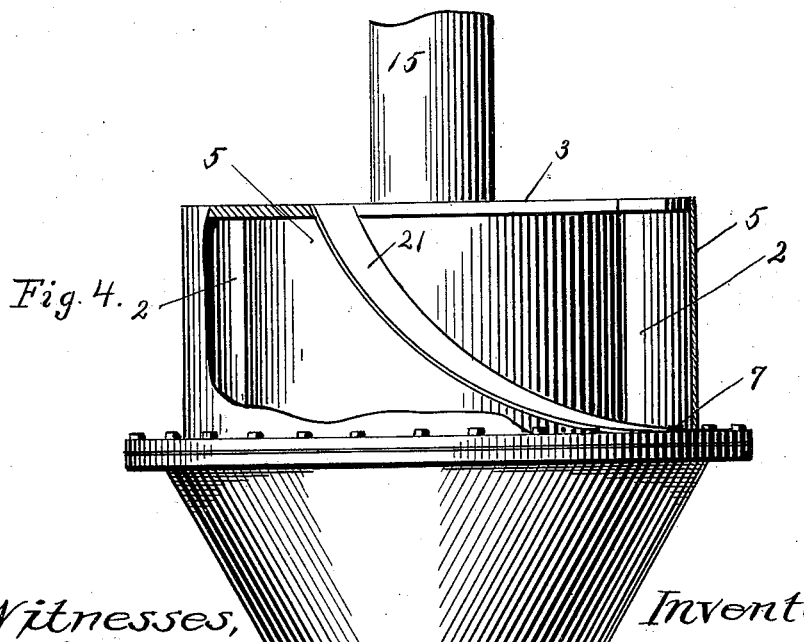
Figures 5, 6:
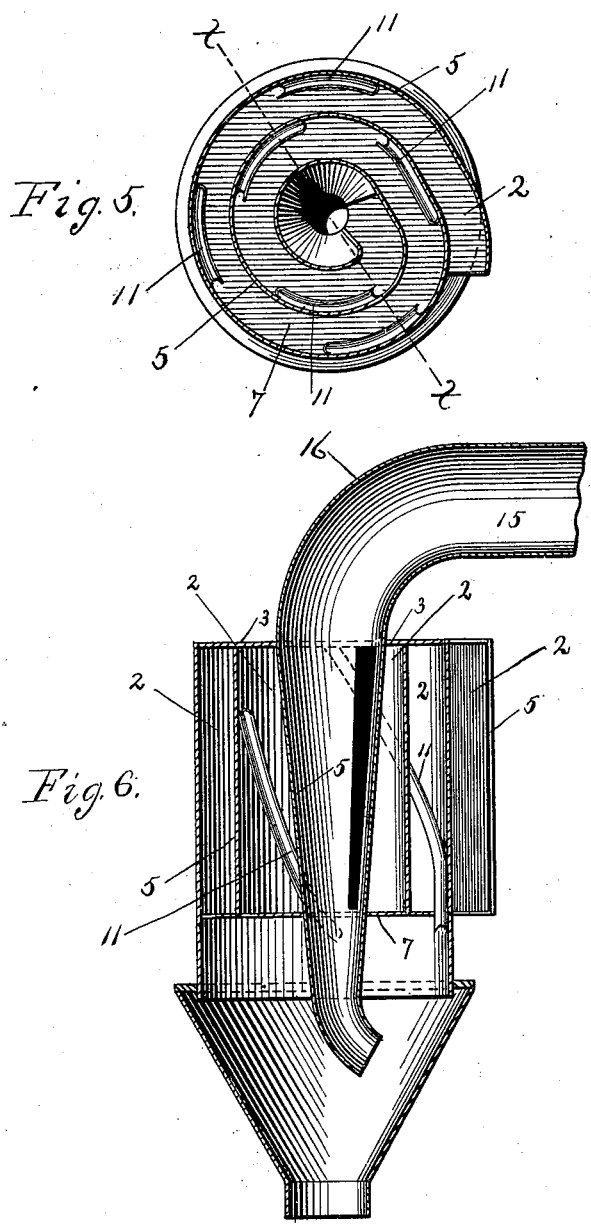

In the accompanying drawings, forming part of this specification, Figure 1 is a horizontal section of a separator constructed in accordance with my invention. Fig. 2 is a vertical central section of the same. Fig. 3 is a plan view of the same, showing a modified arrangement of the opening for the purified air or gaseous current. Fig. 4 is a partial side elevation with the outer wall partially broken away to show the modified arrangement of the discharge-opening. Fig. 5 is a horizontal section showing a modified construction. Fig. 6 is a vertical section on line *x x* of Fig. 5. Fig. 7 is a horizontal section on line *y y* of Fig. 8. Fig. 8 is a vertical section on line *z z* of Fig. 7. Fig. 9 is a partial vertical section of the collector shown in Fig. 8, taken on a plane at right angles to that of Fig. 8.

In the drawings, 2 represents a spiral or convolute passage or duct constituting the body of the collector. This passage is provided with a closed top 3, with an imperforate spiral wall 5, and a bottom 7. The bottom 7 is preferably arranged so as to leave a narrow slot between its outer edge and the inner surface of the spiral wall, as shown in Figs. 1 and 2, but, if preferred, the bottom may entirely cover the under side of the passage, as shown in Figs. 5, 6, 7, 8, and 9. Skimmers or deflectors 11 are preferably arranged in an inclined position on the inner surface of the spiral wall, and they extend toward or below the bottom 7. These deflectors, where the slotted bottom is used, as shown in Figs. 1 and 2, will extend through this slot, but where the bottom is used without having the slot in it, as shown in Figs. 5 and 6, the deflectors extend through special openings provided for them in said bottom, as shown in Figs. 5 and 6, or, if preferred, I may form the deflectors by providing slots in the imperforate wall of the spiral passage and arranging the skimmers 11 in said slots and having their lower ends connect with pipes 13, leading to the discharging-hopper or discharge-spout, as indicated by dotted lines in Fig. 8, or as shown in Fig. 9. An inlet pipe or conductor 15 leads into the spiral chamber or passage at its center or inner end, said conductor preferably extending downward through the closed top of the chamber. This inlet-conductor is preferably provided above the collector with an elbow or curved section 16, which causes the dust, shavings, or solid particles in the moving gaseous current to be thrown against the wall of the pipe at one side as it enters the collector. The conductor, after it passes through the top wall of the collector, is open at one side and its lower end may either be curved, as shown in Figs. 1 and 2, or it may extend into the lower part of the collector and open into the hopper hereinafter described, as shown in Fig. 6, the lower end being slightly turned, or the lower end of the pipe may itself form the hopper or receiver, as shown in Figs. 8 and 9. In either construction the open side of the conductor joins onto or leads into the inner end of the spiral duct or passage, and thereby the gaseous current having solid particles in suspension therein is directed into this spiral passage and travels along therein, and the dust, shavings, or other solid particles carried by the currents are thrown against and travel along in close proximity to the inner surface of the spiral wall of said duct or passage. The dust or solid particles coming in contact with the inclined deflector are by them directed downward into the space below the bottom of the spiral passage and fall into the hopper or receiver below.

The bottom of the spiral chamber or passage is preferably arranged above the lower end of the spiral wall and above the horizontally-curved lower end of the inlet-conductor, as shown in Fig. 2. Hence the heaviest of the solid particles separated from the current pass directly beneath said bottom into the part of said spiral chamber or passage that is below said bottom, and then drop directly into the receiver. If preferred, the bottom may be omitted and the spiral chamber be entirely open at its lower end.

The spiral passage may, if preferred, be made in sections, each turn of the spiral constituting a separate section, as indicated in Fig. 1, and each section may be provided with an independent top, as shown in Fig. 2. The bottom may be made in corresponding sections, and as a separate hopper or receiver is provided for each section of the collector each section will thus be rendered independent, and the collector may be increased or diminished by adding or removing a section at will.

The outer end of the spiral duct or passage may be provided with an opening in its top, and a curved deflector 21 may be arranged to direct the purified gaseous current out of this opening, as shown in Figs. 3 and 4. This construction may be employed where it is preferred to have the purified air discharged in an opposite direction.

The operation of the device is as follows: The gaseous current carrying the dust, shavings, water, or other solid particles in suspension is forced into the inlet-conductor, and the heaviest material, or that first separated from the current, passes down the wall of the conductor and below the bottom of the spiral duct or passage and drops directly into the hopper or receiver below. When the construction shown in Figs. 1 and 2 is employed, this part of the material drops directly into the inner hopper. The gaseous current passes along in the spiral duct or passage and the solid particles are brought in contact with or close to the imperforate spiral wall and are skimmed out of the current by the inclined skimmers or deflectors. The solid particles pass out of the bottom of the spiral passage and fall into the hopper or receiver below, while the purified current escapes from the outer open end of the duct or passage. The heavier particles carried in suspension will be deposited at or about the inlet or central part of the spiral, at which point the current will be densest. As the current passes along in the increasing spiral it will become less dense, the passage serving as an expansion-chamber, and the finer particles carried in suspension will, in this part of the passage, be deposited.

In the former patent granted to me, No. 513,090, I have shown a separator consisting of a series of concentrically-arranged chambers, each of which is provided with an open bottom, below which is a hopper or receiver, and the periphery of each chamber has in it an opening permitting the air to escape from said chamber and pass into the next succeeding chamber. In the construction shown in my said patent the air pursues what may be termed a "spiral path" outward, but I secure an expansion of the air in each subsequent chamber and a consequent precipitation of the dust therein. In the construction shown in this application I use but a single continuous chamber, which is of spiral form and is formed by a continuous-surfaced spiral wall or partition in which the dust-laden air enters at the central or smallest part of the chamber, and as the air passes along in said spiral chamber it is gradually and equally expanded and the dust is deposited and passes out through the openings in the bottom of the chamber.

My present invention is limited to a separator which employs a continuous-surfaced spiral wall or partition. There are numerous advantages in this construction, among them being that the air is gradually and regularly expanded from the point where it enters the spiral chamber to the point where it is finally expelled therefrom. Moreover, this separator is cheaper in construction and better results in the separation of very fine dust are secured therein.

The details of construction of the device may obviously be materially modified without departing from the principle of my invention.

I claim as my invention—

1. A separator consisting of a spiral or convolute duct or passage, having a continuous-surfaced spiral wall or partition provided with a discharge for the separated solid particles, with an opening at its outer end for the escape of the purified gaseous current, and with an inlet-conductor connecting with the inner or central end of said duct or passage, substantially as described.

2. A separator consisting of a spiral or convolute duct or passage, having a continuous-surfaced wall or partition provided with an outlet for the separated solid particles, deflectors to direct said particles to said outlet, an outlet for the purified gaseous current at the outer end, and with an inlet-opening at the inner or central end of said duct or passage, substantially as described.

3. A separator consisting of a chamber having a continuous-surfaced spiral wall or partition in which the gaseous current passes from the central portion to the periphery of said chamber as it becomes freed from the solid particles held in suspension, said chamber being provided with an inlet-opening located substantially at its central portion, an opening for the separated solid particles, and a peripheral opening for the purified gaseous current, substantially as described.

4. A separator, consisting of a chamber containing a spiral passage having a continuous-surfaced spiral wall or partition through which the gaseous current passes as it becomes freed from the solid particles held in suspension, said chamber having an opening for the separated particles, and an opening at its periphery for the purified gaseous current, substantially as described.

5. A separator, consisting of a chamber containing a spiral passage, having a continuous-surfaced spiral wall or partition through which the gaseous current passes as it becomes freed from the solid particles held in suspension, deflectors arranged to deflect said particles out of said current, an outlet in said chamber for the separated particles and an outlet at the periphery of said chamber for the purified current, substantially as described.

6. A separator, consisting of a spiral or convolute duct or passage, provided with a closed top and with an imperforate continuous-surfaced spiral wall, and with a discharge for the separated solid particles, an opening at its outer end for the escape of the purified gaseous current, and an inlet-conductor connecting with the inner or central end of said chamber, substantially as described.

7. A separator, consisting of a spiral or convolute duct or passage, provided with a closed top and with an imperforate continuous-surfaced spiral wall, a discharge in its bottom for the solid particles, inclined skimmers or deflectors arranged upon the inner surface of said spiral wall, and adapted to direct the solid particles below said bottom, an open outer end for the escape of the purified gaseous current, and an inlet-conductor connecting with the inner or central end of said duct or passage, substantially as described.

In testimony whereof I have hereunto set my hand, this 30th day of December, 1893, at Minneapolis, Minnesota.

HENRY L. DAY.

In presence of—
  A. C. PAUL,
  M. E. GOOLEY.